Figure 1:
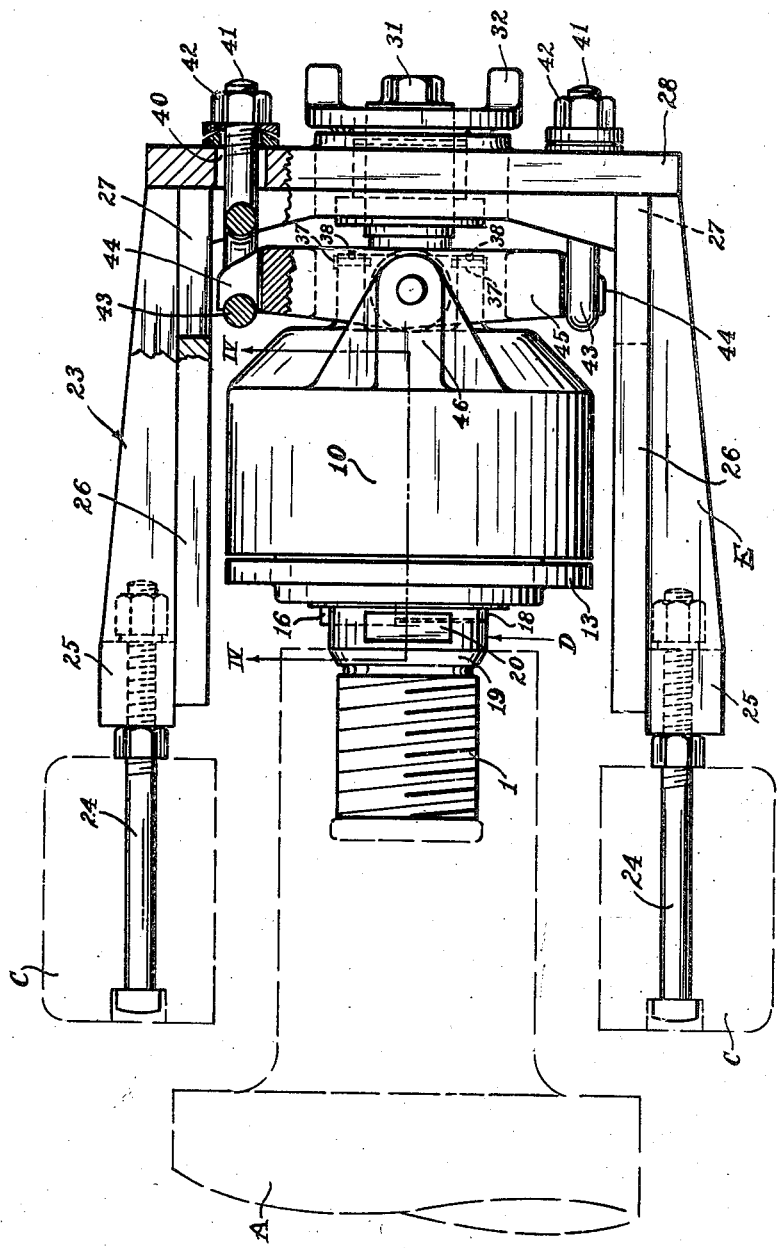

Jan. 12, 1954

W. HYAMS 2,665,959

THRUST BEARING

Filed April 27, 1949

3 Sheets-Sheet 1

INVENTOR
William Hyams
by William B. Wharton
his attorney

Jan. 12, 1954
W. HYAMS
2,665,959
THRUST BEARING
Filed April 27, 1949
3 Sheets-Sheet 2
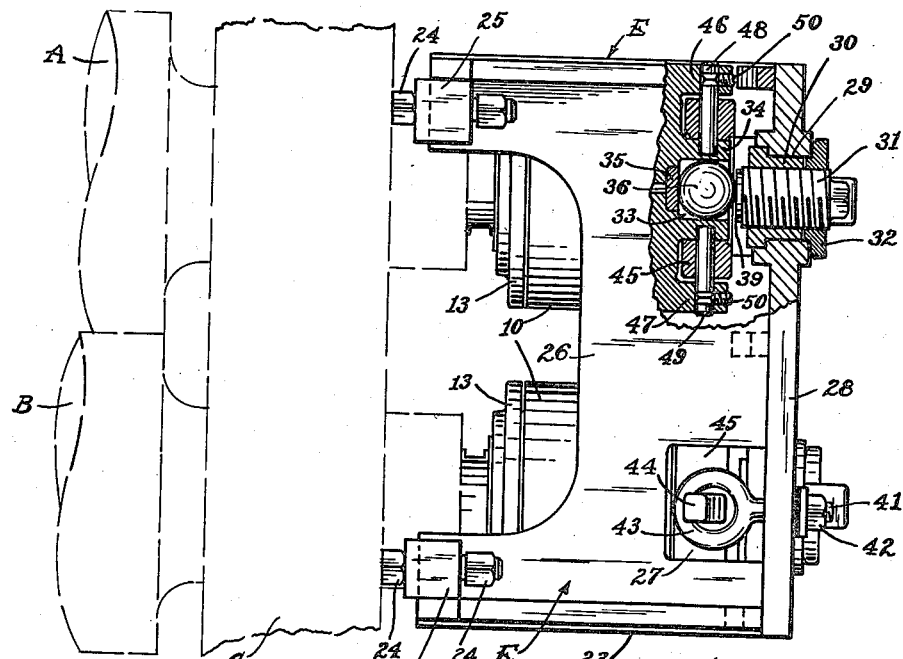
Fig. II
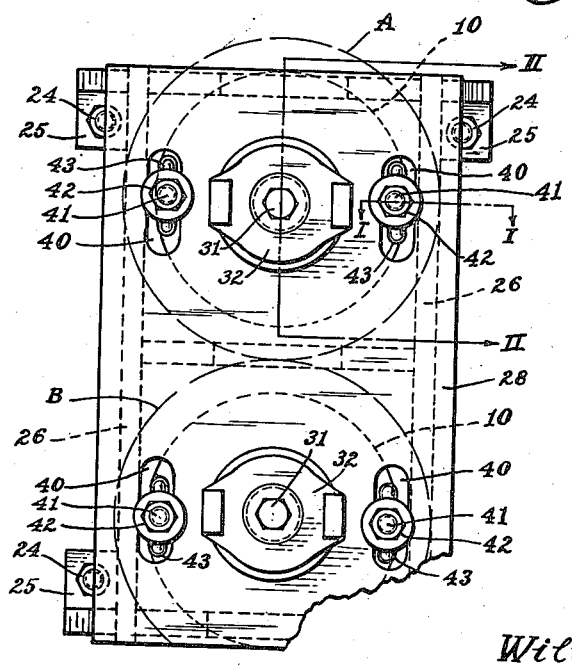
Fig. III
INVENTOR.
William Hyams
by William B. Wharton
his attorney

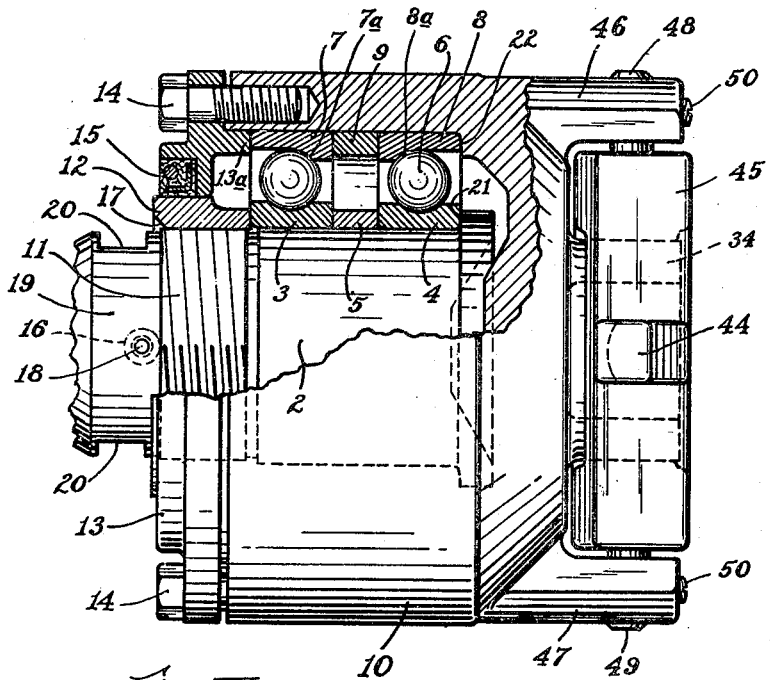
Fig. IV
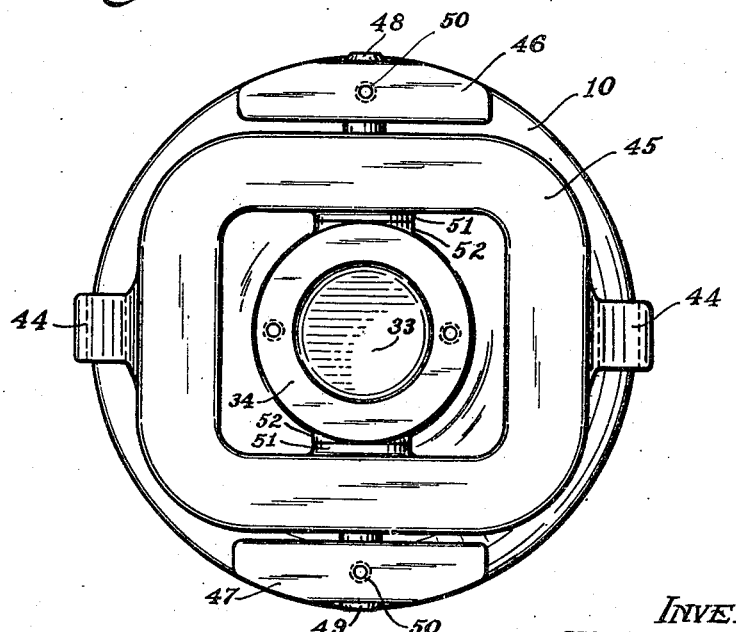
Fig. V
INVENTOR
William Hyams
by William B. Wharton
his attorney Patented Jan. 12, 1954

2,665,959

UNITED STATES PATENT OFFICE 2,665,959

THRUST BEARING

William Hyams, Pittsburgh, Pa., assignor to Mackintosh-Hemphill Company, Pittsburgh, Pa., a corporation of Delaware Application April 27, 1949, Serial No. 89,897

4 Claims. (Cl. 308—233)

This invention relates to a thrust bearing for rolling mills.

In rolling mills employing grooved rolls as in mills for rolling bars, rods, wire and the like, an accurate matching of the grooves in the co-operating rolls is essential. Such matching requires careful axial adjustment of the rolls. For this reason it is important to provide in rolling mills of the above indicated sort not only radial bearings in which the necks of the rolls are rotatable but also one or more thrust bearings to resist the end thrust of each roll. Certain of such thrust bearings are of specialized sort which are applied at one end only of each roll. The function of such thrust bearings is to provide a rigid support axially of each roll to maintain the rolls securely in accurate alignment of their cooperative grooves, and also to provide for the establishment of such alignment by axial adjustment of the rolls and to allow for operation of the paired rolls in positions tilted slightly from a true perpendicular relation with the roll housing.

In thrust bearings for performing the above noted functions in the assembly of rod, bar and wire mills, the structure of the thrust bearings comprises an assembly element rotatable with the roll and an assembly element non-rotatably mounted from the roll housing. Included in the complete assembly there are friction-reducing members, such as cones or balls to reduce friction between the element of the thrust bearing which is rotatable with the roll and the element of the thrust bearing which is non-rotatably mounted. Desirably this friction-reducing structure of the assembly is enclosed for the retention of lubricant, and certain parts in or associated with the enclosed structure of the bearing provide for the necessary adjustment and compensatory arrangement with respect to the roll and provide the requisite backing to hold the roll in its position of proper axial adjustment.

The above being the general structure and function of the more specialized type of thrust bearings for use in association with the rolls of rod, bar and the like mills, there are optimum organizations of structure and optimum adaptability toward which the art works. Thus it is desirable that the inner assembly element of the friction-reducing bearing of the structure be rotatable with the roll and that the other assembly elements including the enclosing cartridge of the friction-reducing assembly be non-rotatably engaged with the roll housing. It is desirable that the assembly structure of the bearing which provides for the reduction of friction be so arranged that no axial play is permitted, for the reason that even a slight tolerance within this structure of the bearing permits sufficient axial movement of the roll to prevent maximum nicety of matching in the grooves of the two co-operating rolls. It is desirable that means providing compensation for slight tilting and slight vertical adjustment of the roll be arranged in alignment with the axis of the bearing and of the roll and exteriorly of the bearing cartridge so that it will function without the presence of tolerance in the friction-reducing portion of the bearing, and that the structure which provides axial backing support for the roll be an element of such means, so that reaction against axial movement of the roll is directed axially of the roll despite any slight tilting in the position thereof. It is desirable that the means by which axial adjustment of the roll is effected should comprise elements apart from the friction-reducing assembly of the bearing and the mounting of such assembly, so that such elements are to a minimum extent subjected to battering in operation of the mill and are readily replaceable if injured or destroyed. It is desirable that such axial adjustment be readily and simply effected by operation of the adjusting elements, and that vertical adjustment likewise be readily and simply effected without disturbing the axial relation of the rolls. Also it is desirable that the roll with the friction-reducing assembly of the thrust bearing attached thereto be removable from the roll stand without detaching associated structure of the bearing assembly from mounted position on the roll housing.

It is the object of the present invention to provide a thrust bearing conforming to the desirable features above noted and providing such additional advantages as arise from its structural organization.

Briefly to describe the apparatus arrangement by which advantages are inherently provided, the bearing of my invention comprises a spindle threaded into or otherwise suitably secured at the end of one roll neck to rotate with the roll. Rotatable with the spindle and roll there is a race for anti-friction members, preferably balls. A second race for the anti-friction balls is non-rotatably mounted in an enclosing cartridge, which cartridge is fixed against rotation with the roll. Separate means bear against the two ball races to eliminate any play in this portion of the structure and in effect to preload the anti-friction assembly of the bearing. No means compensating for an angular position of the roll or for axial adjustment of the roll are provided within the enclosed assembly of the bearing. Such compensation is provided by means which comprise a member, such as a ball, having a curved surface mounted at the outer end of the cartridge in alignment with the longitudinal axis of the bearing spindle and the roll. A bracket is secured to the roll housing to extend on both sides of and across the enclosed assembly of the bearing. In this bracket there is mounted a thrust element, such as a screw, which bears against the curved member mounted axially at the outer end of the cartridge. This member opposes outward axial movement of the roll and directs a positive adjusting or reactive force through the said curved member along the axes of the bearing spindle and the roll. The curved member at the outer end of the cartridge provides compensation for angularity of the roll and receives the positive or reactive force of the thrust member. It is of course possible to reverse these parts to the extent that the curvature of one of the contact surfaces be provided on the thrust member rather than by the cartridge. Carried by the non-rotatable cartridge of the enclosed friction-reducing assembly of the bearing there is a pivoted yoke which is engaged by puller bolts arranged to bear against the outer end of the bracket. These bolts serve to hold the contact member at the forward end of the bearing spindle and cartridge assembly against the thrust member of the bracket, and if the thrust member be retracted act to pull outwardly the enclosed friction-reducing structure of the bearing and the roll to which it is attached. The engagement between the said puller bolts and the bracket is such as to permit the position of the bolts to follow vertical adjustment of the roll and if necessary to accommodate that position to a tilted position of the roll, without changing the position of the bracket on the roll housing.

In the accompanying drawings illustrative of an embodiment of my invention:

Fig. I is a view primarily in plan showing the bearing assembly in relation to a roll and the rolling mill housing, a small portion of the structure being shown in horizontal section in the plane of the section line I—I of Fig. III.

Fig. II is a view primarily in side elevation showing the assembly of two thrust bearings with a bracket common to both and illustrating the relation of the bearings and bracket with respect to the rolls and housing of a rolling mill, this figure of the drawings being partly in vertical section in the plane of the section line II—II of Fig. III.

Fig. III is an end elevation of the thrust bearing assembly shown in Fig. II.

Fig. IV is a view showing the enclosed assembly of the thrust bearing apart from its co-operative bracket and the roll in which it is mounted, this view showing the structure partly in side elevation and partly in vertical section in the plane of the section line IV—IV of Fig. I.

Fig. V is an end elevation of the thrust bearing as shown in Fig. IV.

Referring to the several figures of the drawings all of which show the same structure or portions thereof, reference letters A and B designate the two rolls of a rolling mill which may be understood to be of the grooved type and reference letter C designates the housing or frame of the mill. The thrust bearing comprises a central, or inner, assembly which includes a spindle, designated generally by reference letter D, the inner, or rearward, end 1 of which is threaded into the end of a roll neck. Outwardly, or forwardly, of this point of threaded attachment there is a region 2 of the spindle which is of increased diameter and which carries the sections 3 and 4 of the inner ball race with an annular spacer sleeve 5 interposed between them. On this centrally inner race there rest balls 6 which are embraced by sections 7 and 8 of an outer race, these sections being separated by an annular spacer sleeve 9. It will be noted that the contact of the outer race sections 7 and 8 with ball 6 includes curved shoulders 7a and 8a which are directed away from each other and toward the lateral edges of the cage provided by the race assembly. Whereas the inner race sections 3 and 4 and their spacer sleeve 5 are rotatable with the spindle, the outer race sections 7 and 8 together with the spacer sleeve 9 therebetween are mounted with an enclosing cartridge 10 which has a stationary relation with the mill housing.

Because the two races which confine balls 6 between them do not rotate together, separate means are provided to bear against these races and thus to force the parts of each together and in effect to preload the bearing assembly. For this purpose a region 11 of spindle D inwardly, or rearwardly, of the portion 2 is threaded and carries a threaded sleeve 12 which can be run thereon to bear against section 2 of the inner ball race. A contoured outer sleeve 13 is secured as by means of bolts 14 to cartridge 10 and has a region 13a which bears against section 7 of the outer ball race. There is a slight clearance between sleeves 12 and 13 and an annular oil seal 15 is engaged in the outer sleeve to provide an oil tight closure, or end cover, for the bearing assembly. Inner sleeve 12 is locked in an adjusted position by means of a pin 16 adapted to engage in a chamfered region 17 of the sleeve and to be held in position by a set screw 18 to lock sleeve 12 in its advanced position against the inner ball race. Pin 16 is carried by a hub region 19 of spindle D which has squared wrench-engaging regions 20 for screwing the bearing assembly into mounted position on the neck of the roll.

It will be seen from the above that the inner assembly element of the bearing rotates with the roll and that there is therefore minimum tendency of this inherently low-inertia element to disturb its threaded engagement with the roll because of a tendency to continue in rotation after rotation of the roll has been stopped. Cooperative with the means for effecting axial adjustment, this permits the satisfactory use of a simple threaded insertion of the bearing spindle into the roll neck, solidly to mount the bearing on the roll. The preloading of the bearing and the arrangement of the anti-friction balls reduces play within the bearing to a practically immeasurable quantity. Preloading is caused primarily by the fact that the sleeves 12 and 13 which bear against the inner and outer sectional ball races force the sections of those races firmly against the spacer sleeves between them and against shoulders 21 and 22 formed on the spindle and in the cartridge respectively. Maximum tightness is obtained without binding because of the fact that thrust on the anti-friction elements is transmitted through the accurately matched spacer sleeves of the two races included in the ball cage. It is to be understood that the two spacer sleeves and the sections of the races are susceptible of accurate relative machining to give an interior structure so assembled as to provide of itself a rigid friction-reducing assembly. As will appear, the tight preloading within the enclosed assembly of the bearing is rendered possible by other and cooperative elements of the general bearing assembly which provide the necessary adjustment and flexibility apart from the friction-reducing structure of the bearing.

Associated with the bearing assembly as above described there is bracket structure which provides for the mounting of other elements of the general bearing assembly and which serves to transmit axial thrust of the roll to the frame or housing of the mill. For structural convenience this bracket structure E desirably may be made unitary for the thrust bearings of both rolls, as is shown in the drawings. Bracket E comprises a rectangular frame structure 23 secured to the mill housing C by bolts 24 passed through lugs 25. On its sides and to the rear the bracket structure is shrouded, side shroudings 26 having therein windows 27 and forward shrouding 28 having therein circular openings 29. Fixed in each of the circular openings 29 in the front of the bracket and in line with one of the enclosed bearing structures there is an interiorly threaded sleeve 30 in which a pressure screw, or pusher bolt, 31 is advanceable and retractible. Pusher screw 31 provides the thrust element of the bearing assembly and is supported and locked in adjusted position by a winged locknut 32.

At the outer, or forward, end of cartridge 10 and in line with the longitudinal axes of the bearing spindle and the roll there is a forwardly-open cup 33 formed by an annular flange 34 extended from the structure of the cartridge. At the base of this cup there is a hardened plate 35 against which a metal ball 36 bears. Pins 37 extended through annular flange 34 into the ball retaining cup and locked in adjusted position by set screws 38, hold ball 36 loosely in the cup. Ball 36 provides a curved surface for point contact with a relatively extended plane inner, or rearward, hardened surface 39 of screw 31. Since ball 36 is a sphere loosely held in cup 33 it is free to rotate between its backing plate 35 and the plane surface 39 of screw 31. Diametrically it provides point contact with both its backing plate and the contact surface of the screw.

Under most operating conditions the provision of a loosely mounted ball is advantageous. If, however, it is expected that the bearing is to be subjected to particularly heavy loads it may be desirable to replace the ball with either a hardened plug having a convex contact face cooperative with a plane surface, or with mutually matching concavo-convex surfaces of the contact member carried by the cartridge and by the pusher screw. In operation of the mill a ball gives the best compensation for misalignment if the rolls operate at high speeds and under relatively light load. If, however, a mill is to be operated at relatively slow speed and under relatively heavy load a somewhat more extended contact area desirably is provided between the friction-reducing assembly and the thrust member of the bearing.

Extended through vertical slots 40 in the forward shrouding 28 of the bracket there are puller bolts 41 which carry nuts 42 adapted to bear against the outer surface of the shrouding and having at their inner and rearward ends loops, or eyes, 43. These loops or eyes 43 engage pocketed ears 44 formed laterally on a yoke 45. Extended forwardly, or outwardly, from the body of cartridge 10 there are lugs or ears 46 and 47 having in diametric alignment therein pivot holes through which pass yoke-mounting pins 48 and 49 secured in position by set screws 50. This engagement of cartridge 10 to bracket E by the puller bolts 41 holds the cartridge against rotation with spindle D.

Pins 48 and 49 provide a vertical pivot on which yoke 45 can swing slightly under the individual pull of puller bolts 41 thereon. Extended oppositely into the space embraced by the yoke and perpendicular to pins 48 and 49 the yoke has bosses 51 which have plane surfaces matching with the plane surfaces of bosses 52 on annular flange 34 to provide turning surfaces for the yoke. The action of puller bolts 41 is thus in opposition to pusher screw 31 and holds ball 36 tightly against the pusher screw, by the cooperative action of these elements firmly to integrate the bearing assembly. In outward thrust of the roll the cooperation of the puller bolts and pusher screw serves to transmit end thrust of the roll through cartridge 10, ball 36, screw 31, the bracket structure and bracket mounting bolts 24 to the mill housing. Inward thrust of the roll is resisted by puller bolts 41 and in this case also the thrust is transmitted through bracket E and bracket bolts 24 to the mill housing.

If there be misalignment of the roll in the sense that its axis is deflected slightly, the rolling action and the assumption of end thrust is unimpaired. Lateral misalignment is accommodated by slight swinging adjustment of yoke 45 on its vertical pivot and by the curved surface contact of ball 36 against contact surface 39 of the pusher screw. Vertical misalignment is accommodated by the flexibility provided by the curved surface contact between the cartridge and the pusher screw and by the tolerance provided by eyes 43 of the puller bolts.

It has been explained that the elements associated with the enclosed friction-reducing structure of the bearing provide for axial adjustment of the roll and give accommodation to the various conditions which may be encountered. Thus in axial adjustment of the roll rearwardly, pusher screw 31 and bolts 41 are advanced. Puller bolts 41 then are retracted to maintain firm axial engagement between the contact surfaces of ball 36 and screw 31. In outward adjustment of the roll, screw 31 is retracted and bolts 41 are retracted to bring ball 36 into contact with contact surface 39 of the screw. In the one case the actual adjusting force is exerted by pusher screw 31 and in the other the actual adjusting force is exerted by puller bolts 41. If the position of the roll is slightly tilted with respect to the roll housing, accommodation to such tilted position without loss of the tightness of axial engagement or the axial direction of forces reactive to the end thrust is obtained by the flexibility resulting from contact between the curved surface of ball 36 and the cooperative surface of screw 31. In practice vertical adjustment of the rolls is made merely by operating the head screws of the mill, without operating either the puller bolts or the pusher screw. Such normal adjustments up to about one-eighth inch are permitted merely by movement of ball 36 on the contact surface of pusher screw 31 and by the tolerance provided by the engagement of eyes 43 of the puller bolts with ears 44 of the yoke. The same effect is obtained if the ball shown herein be replaced by a plano-convex or concavo-convex contact between cooperative surfaces provided by a member carried in the cartridge and on the pusher screw. In making vertical adjustment of the roll in major order puller bolts 41 are slightly advanced to loosen their engagement with cartridge 10. If necessary the vertical position of puller bolts 41 then can be adjusted in slots 40 provided in the forward shrouding of bracket E and the roll moved upwardly or downwardly.

It readily will be seen that these several adjustments require no play whatever in the enclosed assembly of the bearing, the requisite flexibility being provided exteriorly of the enclosed anti-friction structure. Also the interior structure of the bearing is relieved of any substantial rolling forces other than end thrust during the rolling operation.

There is no direct engagement between cartridge 10 and bracket E, indirect engagement in adequate order being provided by the opposition of pusher screw 31 and puller bolts 41, which give a floating engagement between the rigid friction-reducing assembly and the bracket.

If a roll is to be removed from the stand, puller bolts 41 are advanced out of contact with the ears 44 of yoke 45 and are swung laterally to free the yoke. This leaves all the assembly of the bearing which is directly mounted with cartridge 10 rather than the bracket E free of the bracket. The roll with those bearing elements attached then may be lifted from the mill stand without disturbing the mounting of the bracket on the mill housing. The cartridge can be removed readily from the spindle for the replacement of the anti-friction balls or analogous anti-friction members.

It will be noted that all the axial and other adjustments which are provided by the bearing can be made simply and accurately. The friction-reducing assembly of the bearing is supported wholly by the roll, without threading or other direct attachment to the bracket of the overall assembly. The threaded thrust-supporting elements of the assembly the threads of which may be battered in service are simple separate members which are readily replaceable. These members provide the flexibility necessary for the accommodations to the conditions of operation, so that the enclosed friction-reducing assembly is free from all axial play. Since the inner portion of the friction-reducing assembly rotates with the roll and the outer portion of that assembly, including the cartridge, is held by the bracket without direct threading thereto, the spindle forming the primary rotatable element can be secured suitably to the roll by bodily threading into the roll neck to provide a simple and sturdy mounting for the friction-reducing assembly.

I claim as my invention:

1. For engagement with a shaft and the shaft housing structure; a thrust bearing comprising the combination of a longitudinally rigid friction-reducing structure including a spindle adapted for direct supported attachment to the neck of a shaft for rotation therewith, an enclosing cartridge surrounding said spindle, an anti-friction assembly disposed between said spindle and said cartridge for facilitating rotation of the spindle with respect to the cartridge, and means for preventing relative axial movement between said spindle and said cartridge and axial play in the said anti-friction assembly therebetween, said friction-reducing structure comprising the spindle, anti-friction assembly and enclosing cartridge assembled as a unitary structure engageable and disengageable with the neck of a shaft while maintaining its assembled condition; with a bracket adapted for mounted attachment to the shaft housing structure, a puller assembly comprising puller members advanceable and retractible in said bracket and connecting means engaging the said puller members with said cartridge to exert thereon a force directed longitudinally of the shaft and outwardly away from the shaft housing and to hold the said cartridge against rotation with the said spindle, the said means engaging the said puller members to the said cartridge providing limited angular rocking and limited vertical movement therebetween, and a pusher assembly comprising a thrust member carried by said bracket advanceable and retractible in approximate alignment with the axes of said spindle and cartridge to exert thereon a force opposed to that exerted by the said puller members and a contact member carried exteriorly and axially of said cartridge in contact with said thrust member, said thrust member and contact member presenting to each other surfaces one of which is convexly curved; the said puller assembly and pusher assembly providing flexibility sufficient to give accommodation to slight vertical shaft adjustment and to shaft misalignment while maintaining tight longitudinal engagement with the said cartridge.

2. For engagement with a shaft and the shaft housing structure; a thrust bearing comprising the combination of a longitudinally rigid friction-reducing structure including a spindle adapted for direct supported attachment to the neck of a shaft for rotation therewith, an enclosing cartridge surrounding said spindle, an anti-friction assembly disposed between said spindle and said cartridge for facilitating rotation of the spindle with respect to the cartridge, and means for preventing relative axial movement between said spindle and said cartridge and axial play in the said anti-friction assembly therebetween, said friction-reducing structure comprising the spindle, anti-friction assembly and enclosing cartridge assembled as a unitary structure engageable and disengageable with the neck of a shaft while maintaining its assembled condition; with a bracket adapted for mounted attachment to the shaft housing structure, a puller assembly comprising a pivoted yoke carried by said cartridge to swing about an axis normal to the axis of rotation of the said spindle and puller-bolts advanceably and retractibly threaded in said bracket and having thereon eyes non-rotatably engageable with said yoke to exert on said cartridge a force directed longitudinally of the shaft and outwardly away from the shaft housing and to hold the said cartridge against rotation with the said spindle, and a pusher assembly comprising a thrust member advanceable and retractible in said bracket in approximate alignment with the axes of said spindle and cartridge to exert thereon a force opposed to that exerted thereon by said puller-bolts and a contact member carried exteriorly and axially of said cartridge in contact with said thrust member, said contact member and said thrust member presenting to each other contact surfaces one of which is convexly curved; the said puller assembly and pusher assembly providing flexibility sufficient to give accommodation to slight vertical shaft adjustment and to shaft misalignment while maintaining tight longitudinal engagement with the said cartridge.

3. For engagement with a shaft and the shaft housing structure; a thrust bearing comprising the combination of a longitudinally rigid friction-reducing structure including a spindle adapted for direct supported attachment to the neck of a shaft for rotation therewith, an enclosing cartridge surrounding said spindle, an anti-friction assembly disposed between said spindle and said cartridge for facilitating rotation of the spindle with respect to the cartridge and means for preventing relative axial movement between said spindle and said cartridge and axial play in the said anti-friction assembly therebetween, said friction-reducing structure comprising the spindle, anti-friction assembly and enclosing cartridge assembled as a unitary structure engageable and disengageable with the neck of a shaft while maintaining its assembled condition; with a bracket adapted for mounted attachment to the shaft housing structure, a puller assembly comprising puller members advanceable and retractible in said bracket, connecting means engaging the said puller members with said cartridge to exert thereon a force directed longitudinally of the shaft and outwardly away from the shaft housing and to hold the said cartridge against rotation with the said spindle, the said means engaging the said puller members to the said cartridge providing limited angular rocking and limited vertical movement therebetween, and a pusher assembly comprising a thrust member advanceable and retractible in said bracket in approximate alignment with the axes of said spindle and cartridge to exert thereon a force opposed to that exerted thereon by said puller members and a contact member carried exteriorly and axially of said cartridge in contact with said thrust member, said contact member and said thrust member presenting to each other one the convex surface of a rotatably mounted ball and the other a relatively extended approximately plane surface, the said puller assembly and pusher assembly providing flexibility sufficient to give accommodation to slight vertical shaft adjustment and to shaft misalignment while maintaining tight longitudinal engagement with the said cartridge.

4. For engagement with a shaft and the shaft housing structure; a thrust bearing comprising the combination of a longitudinally rigid friction-reducing structure including a spindle adapted for direct supported attachment to the neck of a shaft for rotation therewith, an enclosing cartridge surrounding said spindle, an anti-friction assembly disposed between said spindle and said cartridge for facilitating rotation of the spindle with respect to the cartridge, and means for preventing relative axial movement between said spindle and said cartridge and axial play in the said anti-friction assembly therebetween, said friction-reducing structure comprising the spindle, anti-friction assembly and enclosing cartridge assembled as a unitary structure engageable and disengageable with the neck of a shaft while maintaining its assembled condition; with a bracket adapted for mounted attachment to the shaft housing structure, a puller assembly comprising a pivoted yoke carried by said cartridge to swing about an axis normal to the axis of rotation of the said spindle, puller-bolts advanceably and retractibly threaded in said bracket and having thereon eyes non-rotatably engageable with said yoke to exert on said cartridge a force directed longitudinally of the shaft and outwardly away from the shaft housing and to hold the said cartridge against rotation with the said spindle, a pusher assembly comprising a thrust member advanceable and retractible in said bracket in approximate alignment with the axis of said spindle and cartridge to exert thereon a force opposed to that exerted thereon by said puller-bolts and a contact member carried exteriorly and axially of said cartridge in contact with said thrust member, said contact member and said thrust member presenting to each other one the convex surface of a rotatably mounted ball and the other a relatively extended approximately plane surface, the said puller assembly and pusher assembly providing flexibility sufficient to give accommodation to slight vertical shaft adjustment and to shaft misalignment while maintaining tight longitudinal engagement with the said cartridge.

WILLIAM HYAMS.

References Cited in the file of this patent

UNITED STATES PATENTS

| Number | Name | Date |
| --- | --- | --- |
| 1,839,497 | Peterson | Jan. 5, 1932 |
| 2,140,335 | Schornrock | Dec. 13, 1938 |
| 2,175,783 | Rose | Oct. 10, 1939 |
| 2,178,628 | Duda | Nov. 7, 1939 |
| 2,200,837 | Fass | May 14, 1940 |
| 2,335,800 | Sheperdson et al. | Nov. 30, 1943 |
| 2,380,971 | Knox | Aug. 7, 1945 |